(12) United States Patent
Yamada

(10) Patent No.: US 9,347,512 B2
(45) Date of Patent: May 24, 2016

(54) DAMPING VALVE FOR SHOCK ABSORBER

(71) Applicant: KAYABA INDUSTRY CO., LTD., Tokyo (JP)

(72) Inventor: Hideki Yamada, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/379,859

(22) PCT Filed: Feb. 18, 2013

(86) PCT No.: PCT/JP2013/053802
§ 371 (c)(1),
(2) Date: Aug. 20, 2014

(87) PCT Pub. No.: WO2013/136911
PCT Pub. Date: Sep. 19, 2013

(65) Prior Publication Data
US 2015/0034437 A1 Feb. 5, 2015

(30) Foreign Application Priority Data
Mar. 14, 2012 (JP) ................. 2012-056846

(51) Int. Cl.
*F16F 9/348* (2006.01)
*F16F 9/32* (2006.01)
*F16K 15/14* (2006.01)

(52) U.S. Cl.
CPC ............. *F16F 9/3484* (2013.01); *F16F 9/3214* (2013.01); *F16F 9/3481* (2013.01); *F16K 15/14* (2013.01); *F16F 9/348* (2013.01)

(58) Field of Classification Search
CPC ....... F16F 9/348; F16F 9/3484; F16F 9/3481; F16F 9/3214
USPC ........................ 188/322.15, 322.22
See application file for complete search history.

(56) References Cited

U.S. PATENT DOCUMENTS 5,085,300 A * 2/1992 Kato ....................... F16F 9/348
188/280
5,148,897 A * 9/1992 Vanroye ................ F16F 9/3482
188/282.6

(Continued)

FOREIGN PATENT DOCUMENTS

JP H07-167191 A 7/1995
JP 10-103512 A 4/1998

(Continued)

OTHER PUBLICATIONS

Extended European Search Report dated Nov. 9, 2015.

*Primary Examiner* — Thomas Irvin
(74) *Attorney, Agent, or Firm* — Rabin & Berdo, P.C.

(57) ABSTRACT

A damping valve includes a valve disk, a retainer, an inner peripheral side flow passage configured to include a valve disk through hole formed in an inner peripheral side of the valve disk and a retainer through hole formed in the retainer and allowing communication between one and other chambers, an outer peripheral side flow passage formed in an outer peripheral side of the valve disk and allowing communication between the one and the other chambers, and a leaf valve in the form of an annular plate arranged on a side of the retainer opposite to the valve disk and configured to openably close the inner peripheral side flow passage by an outer peripheral part. A flow passage area of the retainer through hole is not smaller than that of the valve disk through hole.

6 Claims, 7 Drawing Sheets

(56) References Cited

U.S. PATENT DOCUMENTS

| | | | | |
|---|---|---|---|---|
| 6,397,987 B1* | 6/2002 | Pesch | ................... | F16F 9/3214 |
| | | | | 188/322.15 |
| 6,499,572 B2* | 12/2002 | Masamura | ............ | F16F 9/3235 |
| | | | | 188/282.1 |
| 6,868,947 B2* | 3/2005 | Adamek | ............... | F16F 9/3228 |
| | | | | 188/282.5 |
| 7,228,948 B2* | 6/2007 | Wilda et al. | ............. | 188/322.15 |
| 7,703,586 B2* | 4/2010 | Deferme | ................. | 188/322.13 |
| 7,789,208 B2* | 9/2010 | Yang | .................... | F16F 9/3484 |
| | | | | 188/282.6 |
| 8,157,065 B2* | 4/2012 | Ashiba | ..................... | 188/322.15 |
| 8,307,964 B2* | 11/2012 | de Kock | ..................... | 188/282.6 |
| 8,752,682 B2* | 6/2014 | Park et al. | ................ | 188/322.22 |
| 8,844,687 B2* | 9/2014 | Yu et al. | ......................... | 188/280 |
| 9,212,719 B2* | 12/2015 | Kim | ......................... | F16F 9/348 |
| 9,249,854 B2* | 2/2016 | Kim | ......................... | F16F 9/348 |
| 9,285,008 B2* | 3/2016 | Yamada | ................ | F16F 9/3214 |
| 2006/0185948 A1* | 8/2006 | Schmitt | ..................... | 188/282.5 |
| 2009/0236194 A1* | 9/2009 | Kim | ......................... | 188/322.15 |
| 2009/0294232 A1* | 12/2009 | Ashiba | ..................... | 188/322.15 |
| 2011/0209956 A1 | 9/2011 | Maeda | | |
| 2011/0209957 A1 | 9/2011 | Ashiba | | |
| 2012/0048666 A1 | 3/2012 | Murakami | | |
| 2012/0061194 A1* | 3/2012 | Yu | ................................... | 188/288 |
| 2013/0168195 A1* | 7/2013 | Park et al. | ................ | 188/322.22 |
| 2013/0333993 A1* | 12/2013 | Yu | ............................ | 188/322.22 |
| 2014/0231199 A1* | 8/2014 | Kim | ......................... | F16F 9/512 |
| | | | | 188/313 |
| 2015/0008083 A1* | 1/2015 | Yamada | ................... | 188/322.15 |
| 2015/0192184 A1* | 7/2015 | Yamada | ................... | 188/322.15 |

FOREIGN PATENT DOCUMENTS

| | | |
|---|---|---|
| JP | 2002-048180 A | 2/2002 |
| JP | 2008-138696 A | 6/2008 |
| JP | 2011-179550 A | 9/2011 |
| KR | 10-2012-0021258 A | 3/2012 |

* cited by examiner

DAMPING VALVE FOR SHOCK ABSORBER

TECHNICAL FIELD

The present invention relates to a damping valve for shock absorber.

BACKGROUND ART

A damping valve for shock absorber is applied, for example, to a piston unit or the like of a shock absorber for vehicle and is provided with a piston (valve disk) partitioning one chamber and another chamber for storing working fluid in the shock absorber, a flow passage formed in this piston to allow communication between the one and the other chambers, and a damping force generating element such as a leaf valve for applying resistance to the working fluid passing in this flow passage.

When the piston moves toward the one or the other chamber, the one or the other chamber is pressurized and the working fluid moves between the one and the other chambers through the flow passage. In this way, the shock absorber generates a damping force due to the resistance of the damping force generating element.

Since the damping force generated by the shock absorber for vehicle largely affects the ride quality of a vehicle, it is preferable to provide a damping valve capable of realizing various damping characteristics so that the shock absorber can realize a desired damping characteristic (change in damping force in relation to piston speed).

For example, JP2008-138696A discloses a damping valve for shock absorber in which a retainer is provided to be placed on a piston partitioning one chamber and another chamber.

The above damping valve is provided with an inner peripheral side flow passage configured to include a valve disk through hole formed in an inner peripheral side of the piston and a retainer through hole formed in the retainer and allowing communication between the one and the other chambers, and an outer peripheral side flow passage formed in an outer peripheral side of the piston and allowing communication between the one and the other chambers.

In the above damping valve, even if the flow passages are formed in the inner and outer peripheral sides of the piston, a diameter of a valve seat on which a leaf valve corresponding to the inner peripheral side flow passage is seated can be increased by laminating the leaf valve via the retainer. Thus, it is possible to use the leaf valve having a large diameter and easily deflectable.

Accordingly, a damping coefficient (ratio of the amount of change in damping force to the amount of change in piston speed) of a valve characteristic due to resistance produced when the working fluid passes through a clearance between an outer peripheral part of the leaf valve and the valve seat can be decreased.

Further, a damping force characteristic can be variously changed by replaceably mounting retainers having various dimensions and shapes.

SUMMARY OF INVENTION

A shock absorber to which the above damping valve is applied generates a damping force with a port characteristic due to resistance produced during the passage of the working fluid in the inner peripheral side flow passage when the leaf valve is opened to a certain extent. Further, the damping force with the port characteristic can be changed by a replacement with a retainer having a different flow passage area of a retainer through hole.

However, in order to enable the generation of a damping force with a port characteristic dependent on the flow passage area of the retainer through hole, it is necessary not to throttle the working fluid passing in the inner peripheral side flow passage by the valve disk through hole.

Accordingly, it is necessary to prepare a special piston formed with a valve disk through hole having a large flow passage area in order to use the piston in combination with retainers having various dimensions and shapes. In the case of singly using this special piston, there is a problem of being difficult to increase the damping coefficient of the port characteristic since the flow passage area of the valve disk through hole is large.

The present invention was developed in view of the above problem and aims to provide a damping valve for shock absorber which enables a piston (valve disk) to be used in combination with a retainer and can increase a damping coefficient of a port characteristic also in the case of singly using the piston and change a damping force with a port characteristic.

According to one aspect of the present invention, a damping valve for shock absorber includes a valve disk partitioning the interior of a cylinder into one chamber and another chamber, a retainer provided to be placed on the valve disk, an inner peripheral side flow passage configured to include a valve disk through hole formed in an inner peripheral side of the valve disk and a retainer through hole formed in the retainer and allowing communication between the one and the other chambers, an outer peripheral side flow passage formed in an outer peripheral side of the valve disk and allowing communication between the one and the other chambers, and a leaf valve in the form of an annular plate arranged on a side of the retainer opposite to the valve disk and configured to openably close the inner peripheral side flow passage by an outer peripheral part, wherein a flow passage area of the retainer through hole is not smaller than that of the valve disk through hole.

An embodiment and advantages of the present invention are described in detail below with reference to the accompanying drawings.

DESCRIPTION OF EMBODIMENTS

Hereinafter, an embodiment of the present invention is described with reference to the drawings. It should be noted that the same reference signs given through several drawings denote the same or corresponding components.

Figure 1:
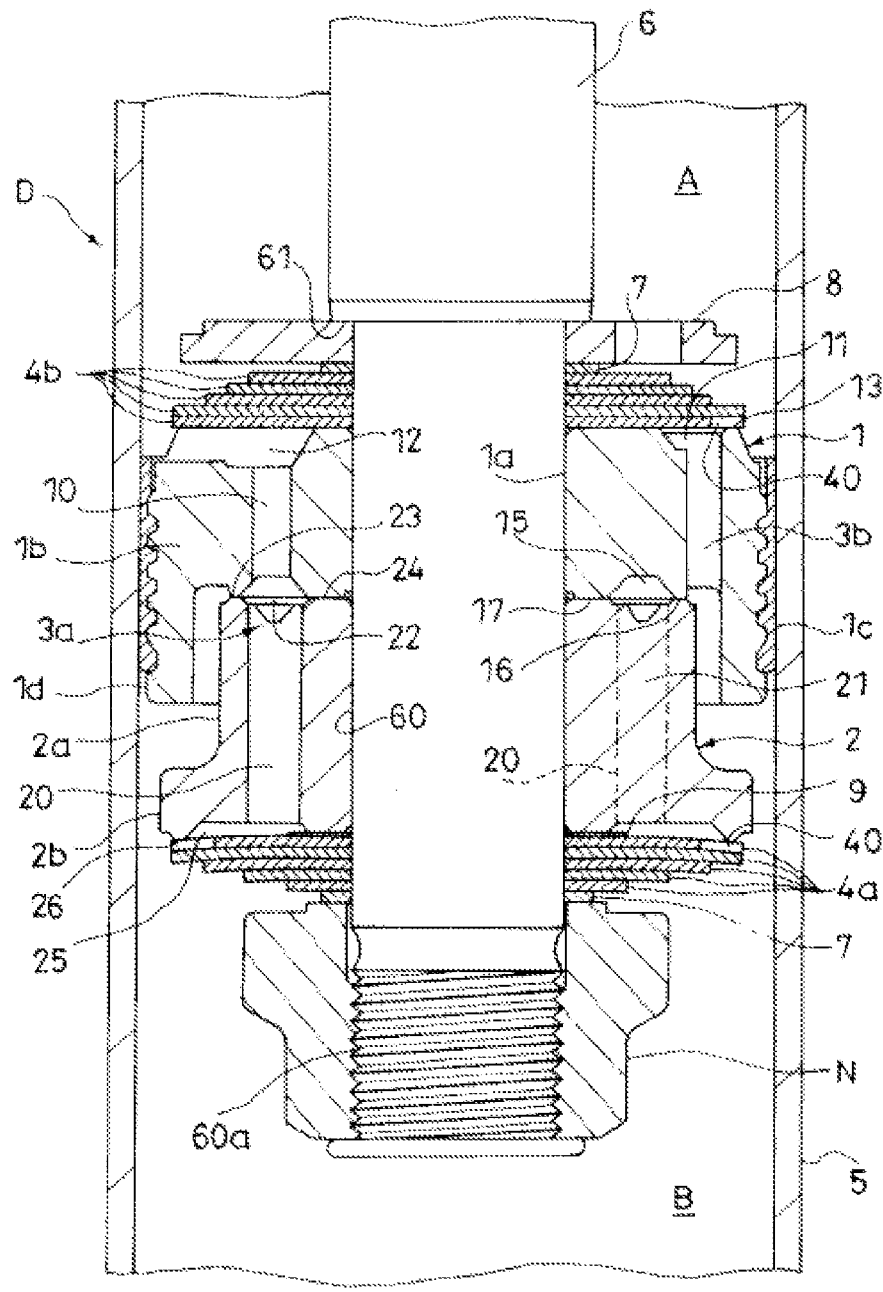
FIG. 1 is a sectional view showing a piston unit of a shock absorber to which a damping valve according to an embodiment of the present invention is applied.

As shown in FIG. 1, a damping valve according to the present embodiment is applied to a piston unit of a shock absorber D and provided with a piston (valve disk) 1 partitioning one chamber A and another chamber B, a retainer 2 provided to be placed on the piston 1, an inner peripheral side flow passage 3a configured to include valve disk through holes 10 formed in an inner peripheral side of the piston 1 and retainer through holes 20 formed in the retainer 2 and allowing communication between the one chamber A and the other chamber B, outer peripheral side flow passages 3b formed in an outer peripheral side of the piston 1 and allowing communication between the one chamber A and the other chamber B, and leaf valves 4a in the form of annular plates arranged on a side of the retainer 2 opposite to the piston and configured to openably close the inner peripheral side flow passage 3a by outer peripheral parts. A flow passage area of the retainer through holes 20 is set to be not smaller than the flow passage area of the valve disk through holes 10.

Further, the shock absorber D is configured to be provided with a cylinder 5 for storing working fluid composed of liquid such as water, aqueous solution or oil, an annular head member (not shown) for sealing an one-side opening of the cylinder 5, a piston rod 6 rotatably supported on the head member and slidably penetrating through the head member, the piston 1 held on a mounting portion 60 of the piston rod 6, a sealing member (not shown) for closing an other-side opening of the cylinder 5, and a reservoir (not shown) or an air chamber (not shown) for compensating for a volumetric change in the cylinder caused by the volume of the piston rod 6 entering the cylinder 5.

Further, the interior of the cylinder 5 is partitioned by the piston 1 into the one and the other chambers A, B filled with the working fluid, and the one and the other chambers A, B communicate via the inner peripheral side flow passage 3a and the outer peripheral side flow passages 3b.

When the piston 1 vertically moves together with the piston rod 6 relative to the cylinder 5, the working fluid flows between the one and the other chambers A, B via the inner and outer peripheral side flow passages 3a, 3b. Resistance is applied to those flows of the working fluid respectively by corresponding leaf valves 4a, 4b to generate a predetermined pressure loss, whereby a predetermined damping force is generated in the shock absorber D.

The damping valve is described in detail below.

A plurality of leaf valves 4b in the form of annular plates, a spacer 7 and a valve stopper 8 are laminated in this order from the piston 1 side on a side of piston (valve disk) 1 in the one chamber A. The retainer 2, a shim 9 in the form of an annular plate, a plurality of leaf valves 4a in the form of annular plates, and a spacer 7 are laminated in this order from the piston 1 side on a side of the piston 1 in the other chamber B.

The mounting portion 60 having a smaller outer diameter than the piston rod 6 is formed on a tip part of the piston rod 6 holding the piston 1, and a step portion 61 is formed between parts having different outer diameters. Further, a screw groove with which a nut N is to be threadably engaged is formed on a tip part 60a of the mounting portion 60.

Accordingly, by threadably engaging the nut N with the tip part 60a in a state where the mounting portion 60 of the piston rod 6 penetrates through axial center portions of the piston 1, the retainer 2, the leaf valves 4a, 4b, the spacers 7, the valve stopper 8 and the shim 9, these can be sandwiched between the step portion 61 and the nut N and held on the piston rod 6.

At this time, inner peripheral sides of the leaf valves 4a, 4b are fixed to the piston rod 6, but outer peripheral sides thereof can be deflected in a direction away from the piston. Further, the leaf valves 4a laminated on the retainer 2 are initially deflected, and this deflection amount can be adjusted by using a shim 9 having a different thickness or changing the number of laminated shims 9.

The piston 1 is provided with a piston main body 1b formed into an annular shape by including a mounting hole 1a though which the mounting portion 60 of the piston rod 6 penetrates, and a slide contact portion 1c which is mounted along the outer periphery of the piston main body 1b and slides in contact with the inner peripheral surface of the cylinder 5. Further, an outer peripheral part of the piston main body 1b extends toward the retainer 2, thereby forming a tubular skirt portion 1d.

The outer peripheral side flow passages 3b allowing communication between the one and the other chambers A, B are formed in an outer peripheral side of the piston main body 1b and at an inner side of the skirt portion 1d, and the exits of the outer peripheral side flow passages 3b are openably closed by the leaf valves 4b. Further, the inner peripheral side flow passage 3a is formed in an inner peripheral side of the piston main body 1b and the retainer 2 and the exit of the inner peripheral side flow passage 3a is openably closed by the leaf valves 4a.

Further, cuts 40 which function as orifices are respectively formed on outer peripheral parts of the leaf valves 4a, 4b located closest to the piston 1 (retainer 2).

The outer peripheral side flow passage 3b penetrates through the piston 1 in a direction of a central axis of the shock absorber D and a plurality of the outer peripheral side flow passages 3b are formed along a circumferential direction in the outer peripheral side of the piston 1. Further, the inner peripheral side flow passage 3a is configured to include a plurality of valve disk through holes 10 penetrating through the piston 1 in the direction of the central axis of the shock absorber D and formed along the circumferential direction in the inner peripheral side of the piston 1 and a plurality of retainer through holes 20 penetrating through the retainer 2 in the direction of the central axis of the shock absorber D and formed along a circumferential direction of the retainer 2.

Figure 2A:
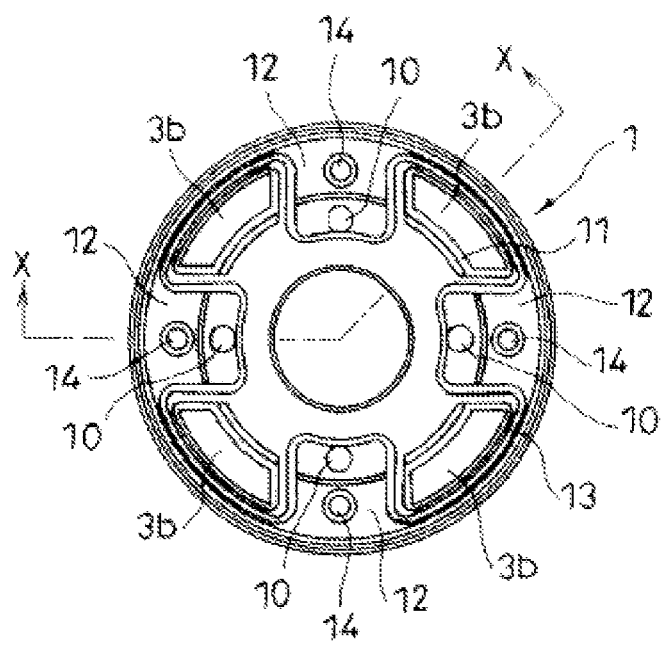
FIG. 2A is a top view showing a piston.

As shown in FIG. 2A, windows 11 continuous with the respective outer peripheral side flow passages 3b and windows 12 continuous with the respective valve disk through holes 10 are alternately formed in the circumferential direction on a surface of the piston 1 opposite to the retainer 2. These windows 11, 12 are partitioned by a petal-shaped valve seat 13 surrounding the outer peripheries of the windows 11. Accordingly, when the leaf valves 4b are seated on the valve seat 13, sides of the outer peripheral side flow passages 3b near the one chamber A are closed by the leaf valves 4b, but sides of the valve disk through holes 10 near the one chamber A are not closed by the leaf valves 4b.

It should be noted that although a projection 14 for supporting the leaf valves 4b from below is provided in each window 12, the projections 14 are not shown in FIG. 1. Further, a cross-section of the piston 1 shown in FIG. 1 is an X-X cross-section of FIG. 2A.

Figure 2B:
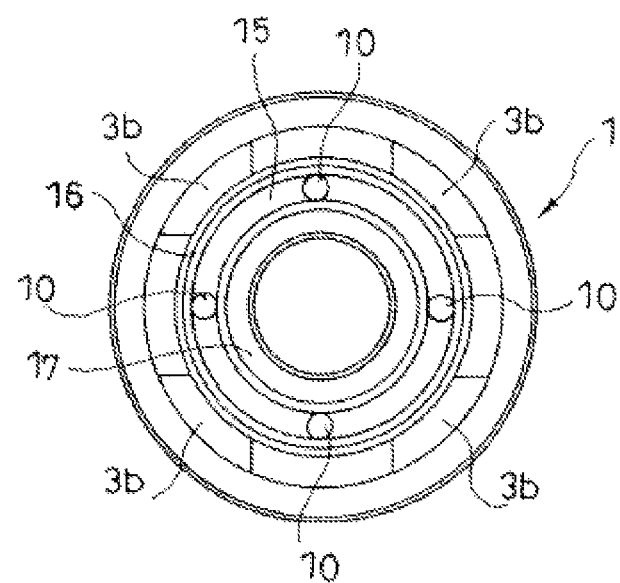
FIG. 2B is a bottom view showing the piston.

Further, as shown in FIG. 2B, an annular window 15 continuous with the valve disk through holes 10, an annular valve seat 16 surrounding the outer periphery of the window 15 and an annular seat portion 17 raised at an inner peripheral side of the window 15 are formed on a surface of the piston 1 near the retainer 2. Further, the outer peripheral side flow passages 3b are open at an outer peripheral side of the valve seat 16.

As shown in FIG. 1, the retainer 2 is provided with a small outer diameter portion 2a and a large outer diameter portion 2b having a larger outer diameter than the small outer diameter portion 2a and formed on a side of the retainer 2 opposite to the piston 1 coaxially with the small outer diameter portion 2*a*, and is inserted into the inside of the skirt portion 1*d* of the piston 1.

The small outer diameter portion 2*a* is formed to have the outer diameter smaller than an inner diameter of the skirt portion 1*d* and a side thereof opposite to the piston 1 projects from the skirt portion 1*d*. Further, there is a clearance between the outer periphery of the large outer diameter portion 2*b* and the cylinder 5 so as not to prevent the working fluid in the other chamber B from flowing into the outer peripheral side flow passages 3*b*.

Figure 3A:
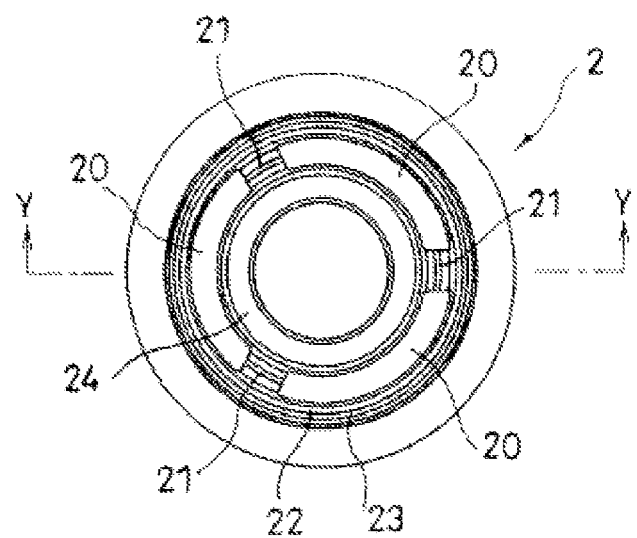
FIG. 3A is a top view showing a retainer.
Figure 3B:
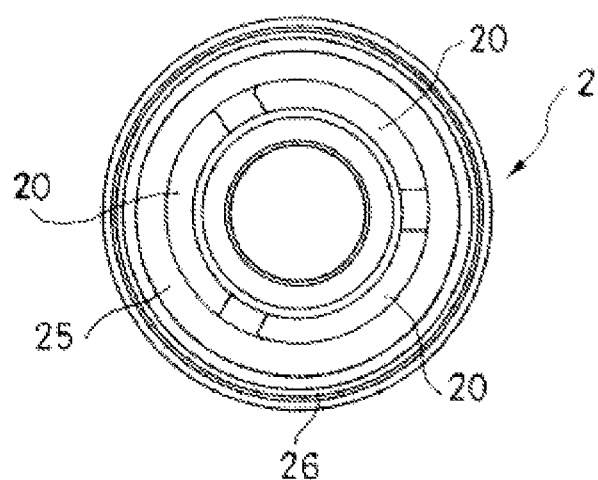
FIG. 3B is a bottom view showing the retainer.

As shown in FIGS. 3A and 3B, the plurality of retainer through holes 20 formed in the retainer 2 are respectively formed into arcuate shapes and arranged at equal intervals along the circumferential direction of the retainer 2. Deformable elastic deforming portions 21 are formed between the plurality of retainer through holes 20. It should be noted that a cross-section of the retainer shown in FIG. 1 is a Y-Y cross-section of FIG. 3A.

A flow passage area of the retainer through holes 20 is set to be not smaller than that of the valve disk through holes 10. The flow passage area of the retainer through holes 20 is the sum of opening areas of the retainer through holes 20. Since each retainer through hole 20 is identically shaped in the present embodiment, the flow passage area of the retainer through holes 20 can be obtained by a product of the opening area per retainer through hole 20 and the number of the retainer through holes 20. Further, the flow passage area of the valve disk through holes 10 is the sum of opening areas of the valve disk through holes 10. Since each valve disk through hole 10 is also identically shaped in the present embodiment, a total opening area of the valve disk through holes 10 can be obtained by a product of the opening area per valve disk through hole 10 and the number of the valve disk through holes 10.

It should be noted that since a cross-sectional area of each of the retainer through holes 20 and the valve disk through holes 10 cut along a plane perpendicular to the central axis of the shock absorber D is set to be equal from the entrance to the exit in the present embodiment, the cross-sectional area of each of the retainer through holes 20 and the valve disk through holes 10 is equal to the opening area thereof. However, if either the retainer through holes 20 or the valve disk through holes 10 or both the retainer through holes 20 and the valve disk through holes 10 are partly reduced in diameter, cross-section areas of narrowest parts are equivalent to opening areas.

As shown in FIG. 3A, an annular window 22 continuous with the retainer through holes 20, an annular outer peripheral seat surface 23 surrounding the outer periphery of the window 22 and an annular inner peripheral seat surface 24 raised at an inner peripheral side of the window 22 are formed on a surface of the retainer 2 near the piston 1. Further, the outer and inner peripheral seat surfaces 23, 24 are formed to meet the valve seat 16 and the seat portion 17 of the piston 1 when the retainer 2 is placed on the piston 1 (FIG. 1).

By bringing the outer peripheral seat surface 23 into close contact with the valve seat 16, the leakage of the working fluid in the middle of the inner peripheral side flow passage 3*a* configured to include the valve disk through holes 10 and the retainer through holes 20 can be prevented.

It should be noted that although a known method can be appropriately adopted as a method for bringing the outer peripheral seat surface 23 into close contact with the valve seat 16, setting is made such that a clearance is formed between the inner peripheral seat surface 24 and the seat portion 17 in a state where the outer peripheral seat surface 23 is held in contact with the valve seat 16 without tightening the nut N in the present embodiment. Then, by tightening the nut N, the elastic deforming portions 21 are elastically deformed and the inner peripheral seat surface 24 is parallelly moved in a direction toward the seat portion 17. Since the outer peripheral seat surface 23 is brought into close contact with the valve seat 16 in this way, the leakage of the working fluid in the middle of the inner peripheral side flow passage 3*a* can be prevented.

As shown in FIG. 3B, an annular window 25 continuous with the retainer through holes 20 and a valve seat 26 in the form of a ring having a large diameter and surrounding the outer periphery of the window 25 are formed on a surface of the retainer 2 opposite to the piston 1. In a state where the leaf valves 4*a* are seated on the valve seat 26, a side of the inner peripheral side flow passage 3*a* in the other chamber B is closed by the leaf valves 4*a*.

Next, functions and effects of the damping valve according to the present embodiment are described with reference to a comparative example of the present invention.

When a piston speed is in a low speed region during extension of the shock absorber D in which the piston rod 6 comes out of the cylinder 5, the pressurized working fluid in the one chamber A moves to the other chamber B through the cuts 40 of the leaf valves 4*a*, 4*b*. Thus, the shock absorber D generates a damping force with a square-law characteristic by the orifices.

When the piston speed increases beyond the low speed region and reaches a middle speed region during extension of the shock absorber D, the pressurized working fluid in the one chamber A deflects outer peripheral parts of the leaf valves 4*a* and moves to the other chamber B through a clearance formed between the valve seat 26 of the retainer 2 and the outer peripheral parts of the leaf valves 4*a*. Thus, the shock absorber D generates a damping force with a proportional characteristic by the leaf valves 4*a*.

When the piston speed further increases and reaches a high speed region and the leaf valves 4*a* are opened to a certain extent during extension of the shock absorber D, the shock absorber D generates a damping force with a port characteristic by resistance produced when the working fluid passes in the inner peripheral side flow passage 3*a*.

When the piston speed is in the low speed region during contraction of the shock absorber D in which the piston rod 6 enters the cylinder 5, the pressurized working fluid in the other chamber B moves to the one chamber A through the cuts 40 of the leaf valves 4*a*, 4*b*. Thus, the shock absorber D generates a damping force with a square-law characteristic by the orifices.

When the piston speed increases beyond the low speed region and reaches the middle speed region during contraction of the shock absorber D, the pressurized working fluid in the other chamber B deflects outer peripheral parts of the leaf valves 4*b* and moves to the one chamber A through a clearance formed between the valve seat 13 of the piston 1 and the outer peripheral parts of the leaf valves 4*b*. Thus, the shock absorber D generates a damping force with a proportional characteristic by the leaf valves 4*b*.

When the piston speed further increases and reaches the high speed region and the leaf valves 4*b* are opened to a certain extent during contraction of the shock absorber D, the shock absorber D generates a damping force with a port characteristic by resistance produced when the working fluid passes in the outer peripheral side flow passages 3*b*.

Figure 5:
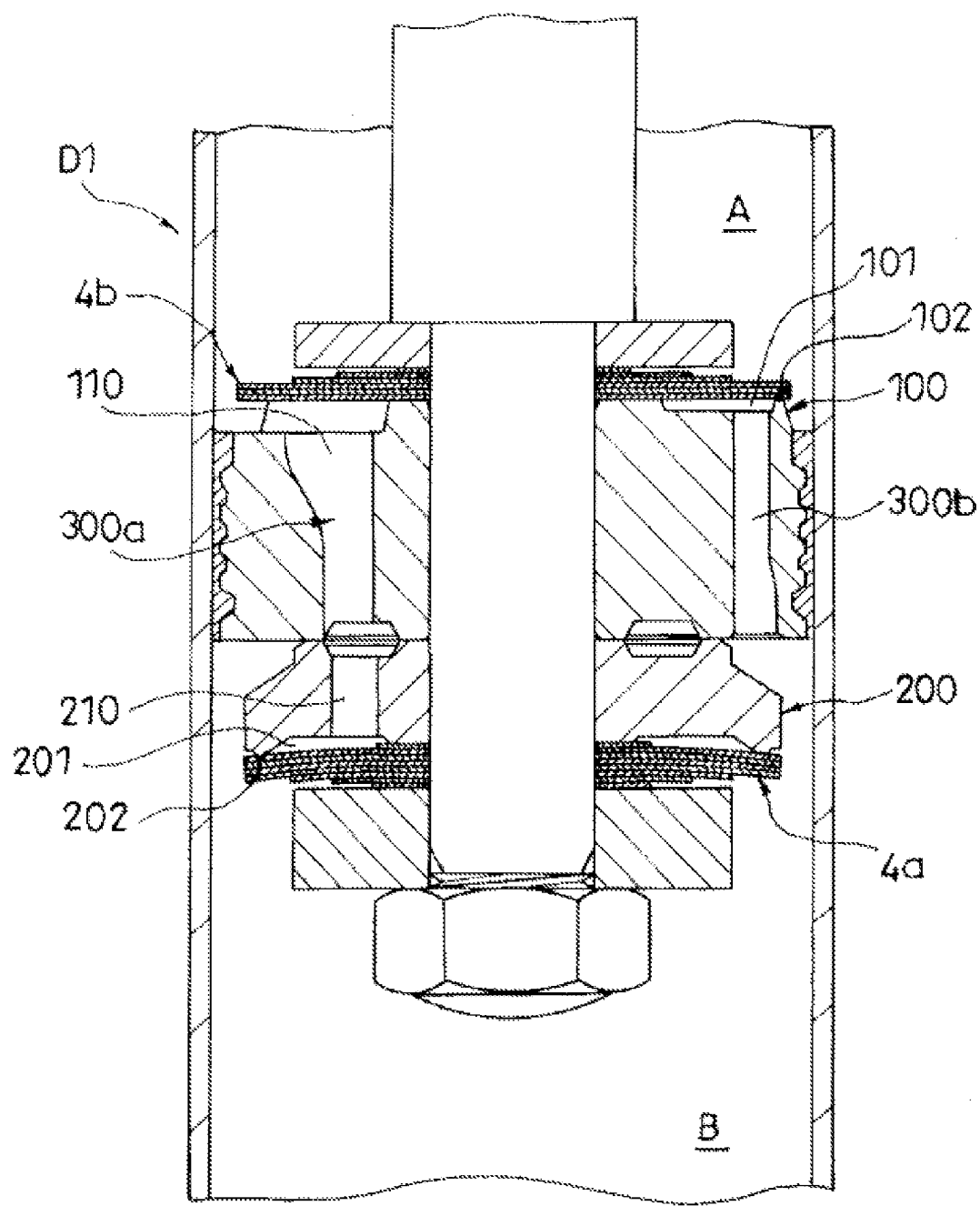
FIG. 5 is a sectional view showing a piston unit of a shock absorber to which a damping valve of a comparative example is applied.

FIG. 5 is a sectional view showing a piston unit of a shock absorber to which a damping valve of a comparative example is applied.

A shock absorber D1 to which the damping valve of the comparative example is applied is provided with a piston 100 partitioning one chamber A and another chamber B, and a retainer 200 provided to be placed on the piston 100 as shown in FIG. 5.

Further, the shock absorber D1 is provided with an inner peripheral side flow passage 300a configured to include a valve disk through hole 110 formed in an inner peripheral side of the piston 100 and a retainer through hole 210 formed in the retainer 200 and allowing communication between the one and the other chambers A, B, and an outer peripheral side flow passage 300b formed in an outer peripheral side of the piston 100 and allowing communication between the one and the other chambers A, B.

A window 101 continuous with the outer peripheral side flow passage 300b and a valve seat 102 surrounding the outer periphery of the window 101 are formed on a surface of the piston 100 opposite to the retainer 200. Further, a window 201 continuous with the inner peripheral side flow passage 300a and a valve seat 202 surrounding the outer periphery of the window 201 are formed on a surface of the retainer 200 opposite to the piston 100. The outer peripheral parts of leaf valves 4a, 4b in the form of annular plates are respectively seated on the valve seats 202, 102 and openably close the exits of the inner and outer peripheral side flow passages 300a, 300b.

In the shock absorber D1, the leaf valves 4a having a large diameter and easily deflectable can be used since a diameter of the valve seat 202 on which the leaf valves 4a corresponding to the inner peripheral side flow passage 300a are seated can be made larger by laminating the leaf valves 4a via the retainer 200 even if the flow passages are formed in the outer and inner peripheral sides of the piston 100.

Accordingly, it is possible to decrease a damping coefficient (ratio of the amount of change in damping force to the amount of change in piston speed) of a valve characteristic due to resistance produced when the working fluid passes through a clearance between the outer peripheral parts of the leaf valves 4a and the valve seat 202.

Further, a damping force characteristic can be variously changed by replaceably mounting retainers 200 having various dimensions and shapes.

Further, the shock absorber D1 generates a damping force with a port characteristic due to resistance during the passage of the working fluid in the inner peripheral side flow passage 300a when the leaf valves 4a are opened to a certain extent. The damping force with the port characteristic can be changed by a replacement with a retainer 200 having a different flow passage area of the retainer through hole 210.

However, in order to enable the generation of a damping force with a port characteristic dependent on the flow passage area of the retainer through hole 210, it is necessary not to throttle the working fluid passing in the inner peripheral side flow passage 300a by the valve disk through hole 110.

Accordingly, it is necessary to prepare a special piston formed with a valve disk through hole 110 having a large flow passage area in order to use the piston in combination with retainers 200 having various dimensions and shapes. In the case of singly using this special piston, there is a problem of being difficult to increase the damping coefficient of the port characteristic since the flow passage area of the valve disk through hole 110 is large.

Contrary to this, since the flow passage area of the retainer through holes 20 is set to be larger than that of the valve disk through holes 10 in the present embodiment, the working fluid having passed through the valve disk through holes 10 is not throttled by the retainer through holes 20. Thus, the damping force with the port characteristic can be set by the flow passage area of the valve disk through holes 10 and the damping force characteristic can be changed by a replacement with a piston 1 having a different flow passage area.

Further, since the flow passage area of the valve disk through holes 10 only has to be not smaller than that of the retainer through holes 20, the damping coefficient of the port characteristic can be increased and an existing piston can be utilized even in the case of singly using the piston 1. When it is desired to increase the damping force due to the resistance of the leaf valves 4a, the piston 1 may be singly used without providing the retainer 2.

Accordingly, if three types of pistons 1 having different flow passage areas of valve disk through holes 10 are prepared, the piston 1 including the valve disk through holes 10 having a largest flow passage area is the piston 1A, the piston 1 including the valve disk through holes 10 having a second largest flow passage area is the piston 1B and the piston 1 including the valve disk through holes 10 having a smallest flow passage area is the piston 1C, the flow passage area of the retainer through holes 20 formed in the retainer 2 to be combined with the pistons 1A, 1B and 1C is set to be not smaller than the flow passage area of the valve disk through holes 10 of the piston 1A. In this way, six kinds of damping characteristics shown in FIG. 4 can be realized.

Figure 4:
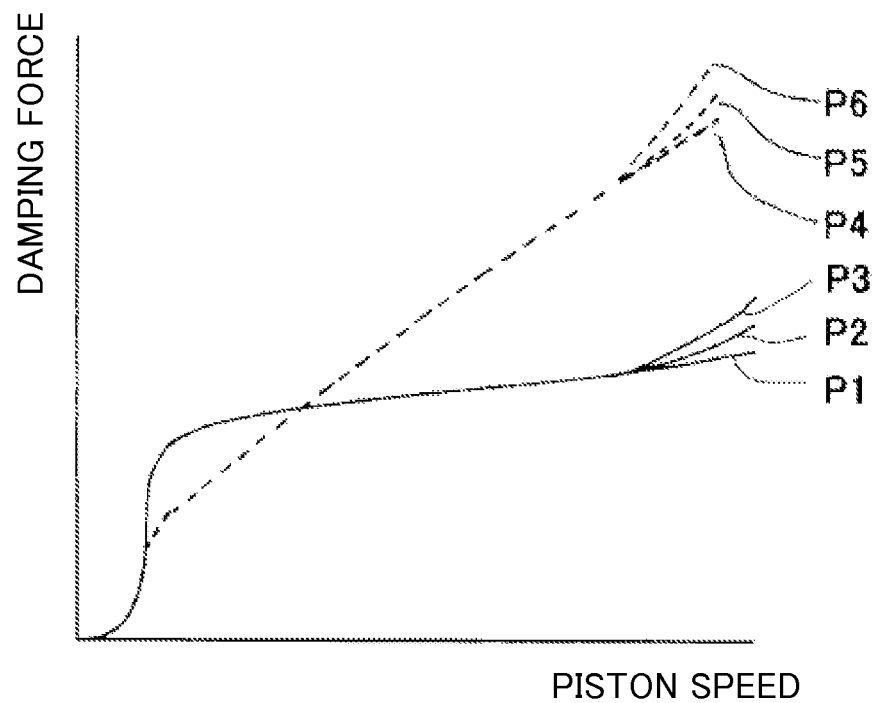
FIG. 4 is a graph showing damping force characteristics of shock absorbers to which damping valves according to the embodiment of the present invention are applied.

P1, P2 and P3 shown in solid line in FIG. 4 represent damping characteristics when the three types of pistons 1A, 1B and 1C are respectively used in combination with the retainer 2 including the retainer through holes 20 having a flow passage area set to be not smaller than that of the valve disk through holes 10 of the piston 1A. P1 indicates a case where the piston 1A is used, P2 indicates a case where the piston 1B is used and P3 indicates a case where the piston 1C is used.

Further, P4, P5 and P6 shown in broken line in FIG. 4 represent damping characteristics when the three types of pistons 1A, 1B and 1C are singly used. In this case, P1 changes to P4, P2 changes to P5 and P3 changes to P6.

According to the present embodiment, by preparing n types of pistons 1 having different flow passage areas of valve disk through holes 10 and one retainer 2 including retainer through holes 20 having a flow passage area set so as not to throttle the working fluid passing through the valve disk through holes 10 of the piston 1 having a largest flow passage area of the valve disk through holes 10 out of the n types of pistons 1, n damping force characteristics in the case of singly using the piston and n damping force characteristics in the case of using the retainer 2 and the piston 1 in combination, i.e. 2n damping force characteristics can be realized. That is, according to the present embodiment, various damping force characteristics can be realized by a small number of components.

Further, since the piston 1 is formed with the inner peripheral side flow passage 3a in the inner peripheral side and the outer peripheral side flow passages 3b in the outer peripheral side, the diameter of the leaf valves 4a becomes smaller and the damping coefficient when the piston speed is in the middle speed region becomes larger when the leaf valves 4a for closing the exit of the inner peripheral side flow passage 3a are directly seated on the valve seat 16 formed on the piston 1.

Accordingly, as in the present embodiment, it is preferable to enable the use of the leaf valves 4a having a large diameter and easily deflectable and enable the damping coefficient when the piston speed is in the middle speed region to be decreased by increasing the diameter of the valve seat 26 on which the leaf valves 4a for closing the inner peripheral side flow passage 3a are seated in the configuration provided with the retainer 2.

Further, since the valve disk through holes 10 and the retainer through holes 20 communicate via the windows 15, 22 in the present embodiment, it is not necessary to position the valve disk through holes 10 and the retainer through holes 20 in the circumferential direction.

Further, since the valve disk through holes 10 and the outer peripheral side flow passages 3b penetrate through the piston 1 in the direction of the central axis of the shock absorber D and the retainer through holes 20 penetrate through the retainer 2 in the direction of the central axis of the shock absorber D, the valve disk through holes 10, the outer peripheral side flow passages 3b and the retainer through holes 20 can be easily formed.

Further, since the piston main body 1b is provided with the skirt portion 1d and the small outer diameter portion 2a of the retainer 2 is inserted into the skirt portion 1d, it is possible to ensure the width of the slide contact portion 1c in the direction of the central axis of the shock absorber D, shorten the width when the piston 1 and the retainer 2 are assembled and miniaturize the shock absorber D.

Embodiments of this invention were described above, but the above embodiments are merely examples of applications of this invention, and the technical scope of this invention is not limited to the specific constitutions of the above embodiments.

For example, although the damping valve in the above embodiment is applied to the piston unit of the shock absorber D, it may be applied to a base valve unit of the shock absorber D.

Further, although the shock absorber D is a hydraulic shock absorber using liquid as the working fluid, it may be a pneumatic shock absorber using gas as the working fluid.

Further, although the valve disk through holes 10 and the retainer through holes 20 communicate via the windows 15, 22 formed on each mating surface of the piston 1 and the retainer 2, positioning in the circumferential direction is not necessary if a window is formed on either one of the piston 1 and the retainer 2. Further, if positioning is possible, the valve disk through holes 10 and the retainer through holes 20 may communicate without via the windows 15, 22.

The shapes of the piston 1 and the retainer 2, the shapes and the numbers of the valve disk through holes 10, the outer peripheral side flow passages 3b and the retainer through holes 20 are not limited to the above ones and can be changed as appropriate.

Further, the retainer 2 in the above embodiment includes the elastic deforming portions 21 between adjacent ones of the retainer through holes 20, whereby the leakage of the working fluid in the middle of the inner peripheral side flow passage 3a can be prevented. However, the elastic deforming portions 21 may not be included if this effect can be achieved.

With respect to the above description, the contents of application No. 2012-056846, with a filing date of Mar. 14, 2012 in Japan, are incorporated herein by reference.

The invention claimed is:

1. A damping valve for a shock absorber, comprising:
   a valve disk partitioning the interior of a cylinder into one chamber and an other chamber;
   a retainer provided on an other chamber side of the valve disk without delimiting the interior of the cylinder;
   an inner peripheral side flow passage configured to include a plurality of valve disk through holes formed in an inner peripheral side of the valve disk, and a plurality of retainer through holes formed in the retainer, and allowing communication between the one and the other chambers;
   an outer peripheral side flow passage formed in an outer peripheral side of the valve disk and allowing communication between the one and the other chambers, the outer peripheral side flow passage directly opening to the other chamber; and
   a leaf valve in the form of an annular plate arranged on a side of the retainer opposite to the valve disk and configured to openably close the inner peripheral side flow passage by an outer peripheral part;
   wherein the cross-sectional area of the plurality of retainer through holes is larger than that of the plurality of valve disk through holes.

2. The damping valve for the shock absorber according to claim 1, wherein:
   an annular window is formed on a mating surface of at least one of the valve disk and the retainer, and the valve disk through holes and the retainer through holes communicate via the annular window.

3. The damping valve for the shock absorber according to claim 1, wherein:
   the valve disk through holes and the outer peripheral side flow passage penetrate through the valve disk in an axial direction, and the retainer through holes penetrate through the retainer in an axial direction.

4. The damping valve for the shock absorber according to claim 1, wherein:
   the valve disk is a piston which slides in contact with an inner peripheral surface of the cylinder; and
   the piston includes:
      a piston main body formed with the outer peripheral side flow passage and the valve disk through holes, and
      a slide contact portion mounted along an outer periphery of the piston main body.

5. The damping valve for the shock absorber according to claim 1, wherein a largest diameter of the retainer is less than that of the valve disk.

6. A damping valve for a shock absorber, comprising:
   a valve disk partitioning the interior of a cylinder into one chamber and an other chamber;
   a retainer provided on the valve disk;
   an inner peripheral side flow passage configured to include a plurality of valve disk through holes formed in an inner peripheral side of the valve disk, and a plurality of retainer through holes formed in the retainer, and allowing communication between the one and the other chambers;
   an outer peripheral side flow passage formed in an outer peripheral side of the valve disk and allowing communication between the one and the other chambers; and
   a leaf valve in the form of an annular plate arranged on a side of the retainer opposite to the valve disk and configured to openably close the inner peripheral side flow passage by an outer peripheral part;
   wherein the cross-sectional area of the plurality of retainer through holes is not smaller than that of the plurality of valve disk through holes;
   the valve disk is a piston which slides in contact with an inner peripheral surface of the cylinder;
   the piston includes:
      a piston main body formed with the outer peripheral side flow passage and the valve disk through holes, and
      a slide contact portion mounted along an outer periphery of the piston main body;
   the piston main body includes a skirt portion, an outer peripheral part of which extends toward the retainer; and the retainer includes:
- a small outer diameter portion to be inserted into the skirt portion, and
- a large outer diameter portion having a larger outer diameter than the small outer diameter portion and formed on a side opposite to the valve disk coaxially with the small outer diameter portion.

* * * * *